May 19, 1931.  F. A. DUQUESNE  1,806,242
SAFETY APPARATUS FOR PROTECTION AND DEFENSE AGAINST
BURGLARY AND VIOLATION OF HABITATIONS
Filed July 10, 1929  5 Sheets-Sheet 1

Inventor
Ferdinand Alexandre Duquesne
By B. Singer, atty.

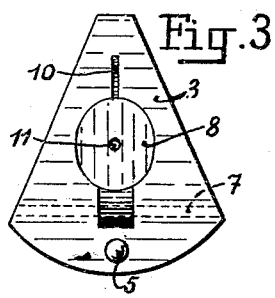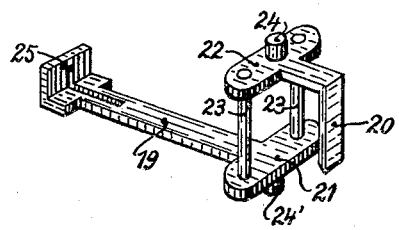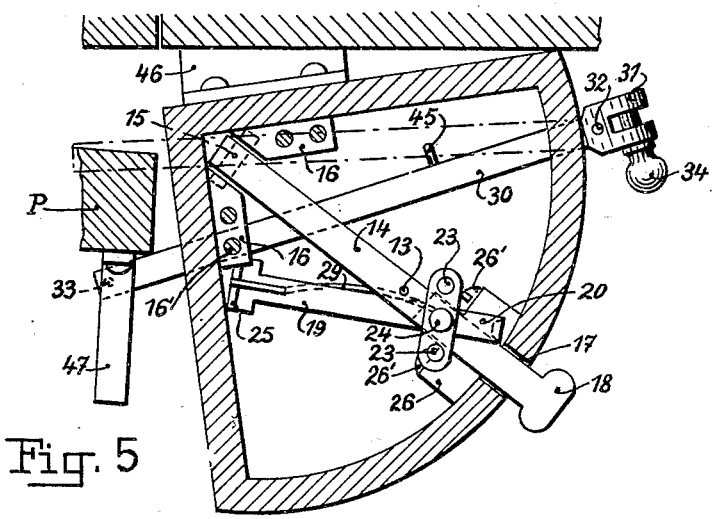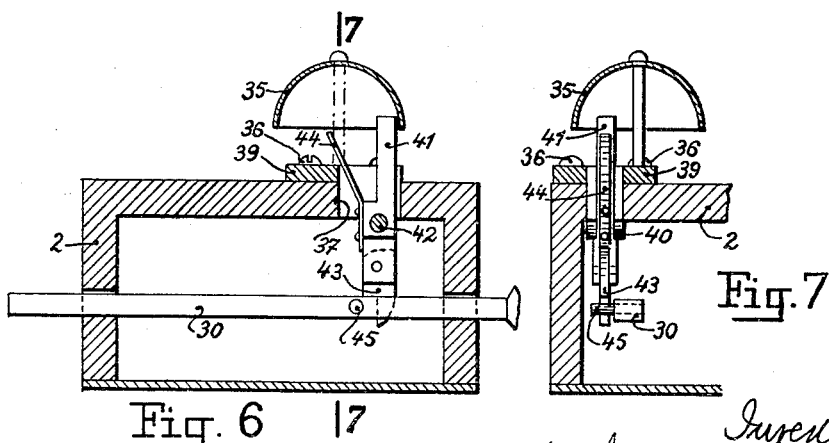

May 19, 1931.  F. A. DUQUESNE  1,806,242
SAFETY APPARATUS FOR PROTECTION AND DEFENSE AGAINST
BURGLARY AND VIOLATION OF HABITATIONS
Filed July 10, 1929  5 Sheets-Sheet 3
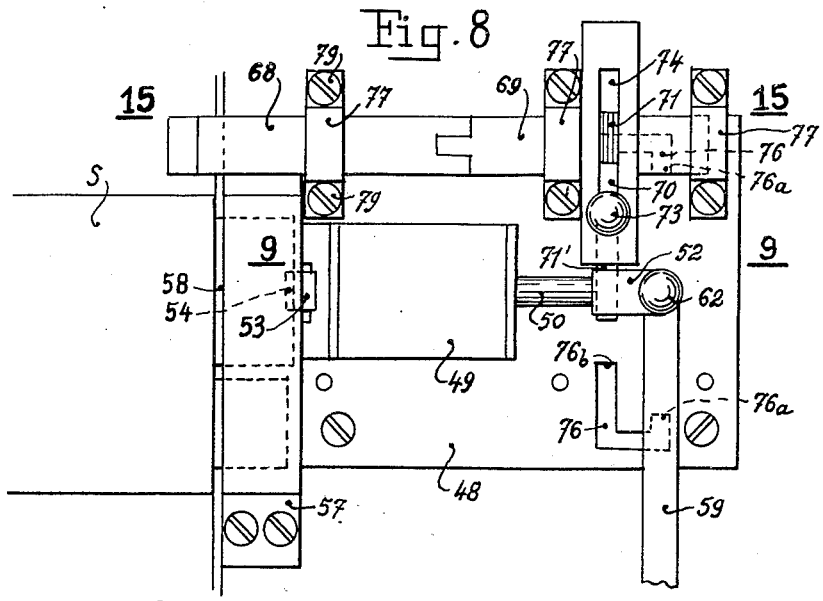
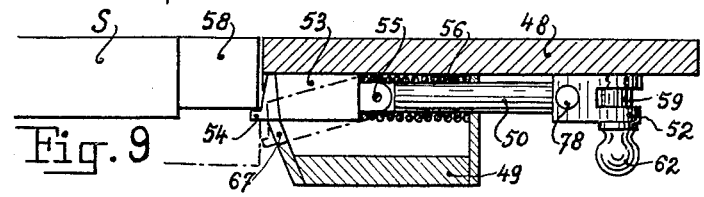
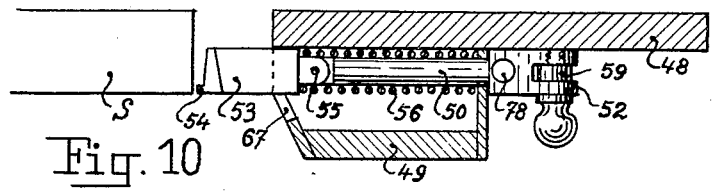
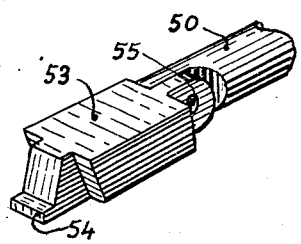
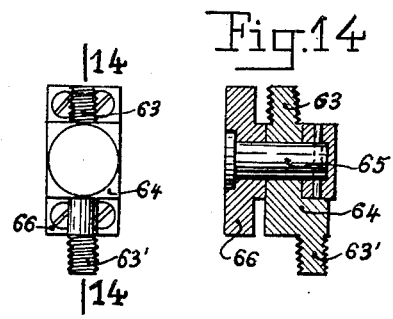

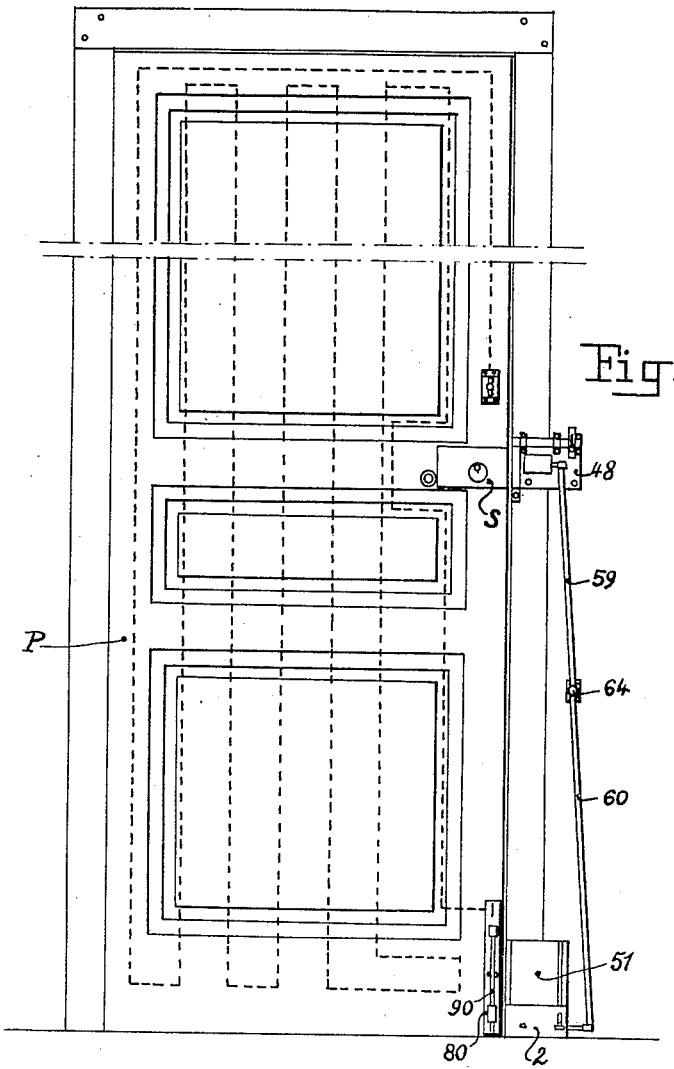
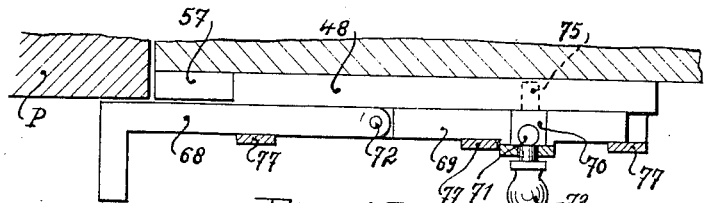

May 19, 1931.  F. A. DUQUESNE  1,806,242
SAFETY APPARATUS FOR PROTECTION AND DEFENSE AGAINST
BURGLARY AND VIOLATION OF HABITATIONS
Filed July 10, 1929  5 Sheets-Sheet 5
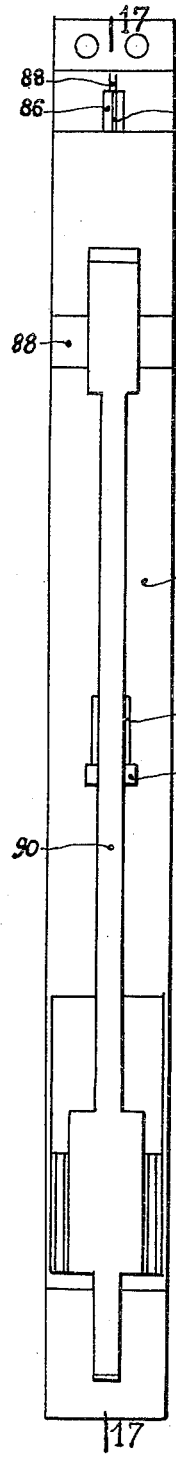
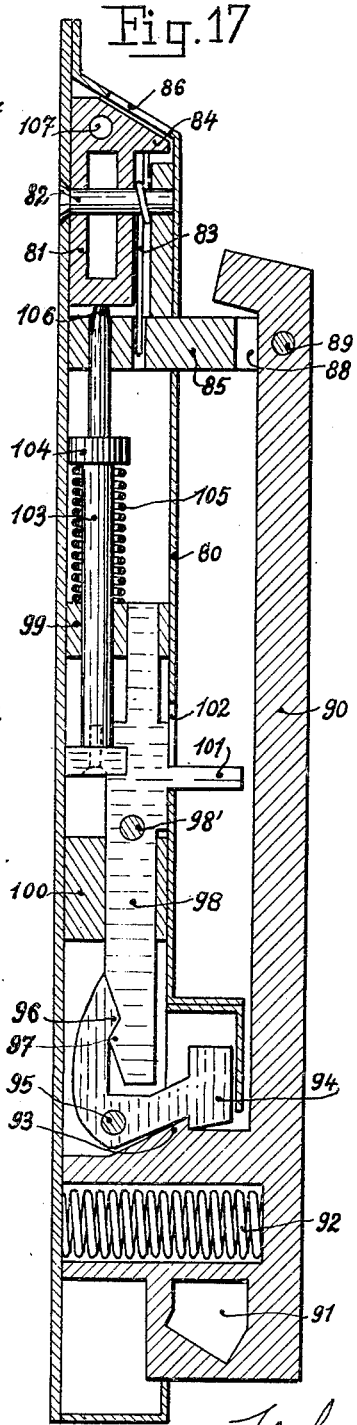
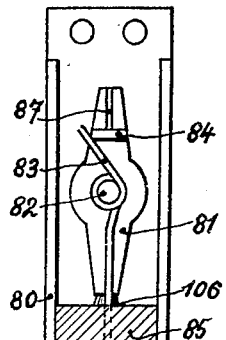
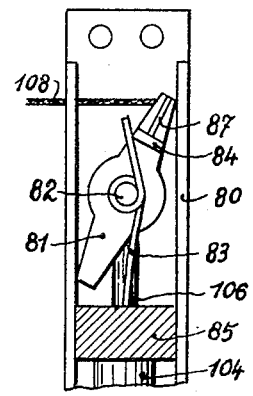
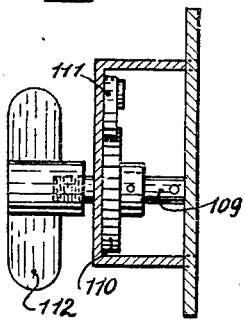

Patented May 19, 1931

1,806,242

UNITED STATES PATENT OFFICE

FERDINAND ALEXANDRE DUQUESNE, OF ST. MAUR DES FOSSES, FRANCE

SAFETY APPARATUS FOR PROTECTION AND DEFENSE AGAINST BURGLARY AND VIOLATION OF HABITATIONS

Application filed July 10, 1929, Serial No. 377,268, and in France July 12, 1928.

This invention relates to improvements in door locking burglar alarms, the object of the invention being to provide an improved apparatus of this character which is effective in operation and can be readily installed.

With the above and other objects in view, the invention consists in the construction, combination and arrangement of devices hereinafter described and claimed.

In the accompanying drawings

Figure 3 is a detail inverted plan of the seat for the barrel.

Figure 4 is a perspective of the detent.

Figure 5 is a plan of the apparatus partly in horizontal section.

Figure 6 is a vertical sectional view of the same.

Figure 7 is a similar view on the plane indicated by the line 7—7 of Figure 6.

Figure 8 is an elevation of a portion of a door provided with fastening devices in accordance with this invention.

Figure 9 is a detail section of the same on a plane indicated by the line 9—9 of Figure 8.

Figure 10 is a similar view with parts in a different position than as shown in Figure 9.

Figure 11 is a detail perspective of the bolt.

Figure 12 is an elevation of a door in closed position and provided with my improved fastening and burglar alarm apparatus.

Figure 13 is a detail elevation of an element of the fastening device.

Figure 14 is a sectional view of the same on the plane indicated by the line 14—14 of Figure 13.

Figure 15 is a detail horizontal sectional view of part of the fastening apparatus.

Figure 16 is a detail elevation of another part of the fastening apparatus.

Figure 17 is a sectional view of the same on the plane indicated by the line 17—17 of Figure 16.

Figure 18 is a detail elevation partly in section of the member 82 and its connections.

Figure 19 is a similar view of the same showing the member 81 in a different position than in Figure 18.

Figure 20 is a detail elevation partly in section of the windlass.

Figure 1:
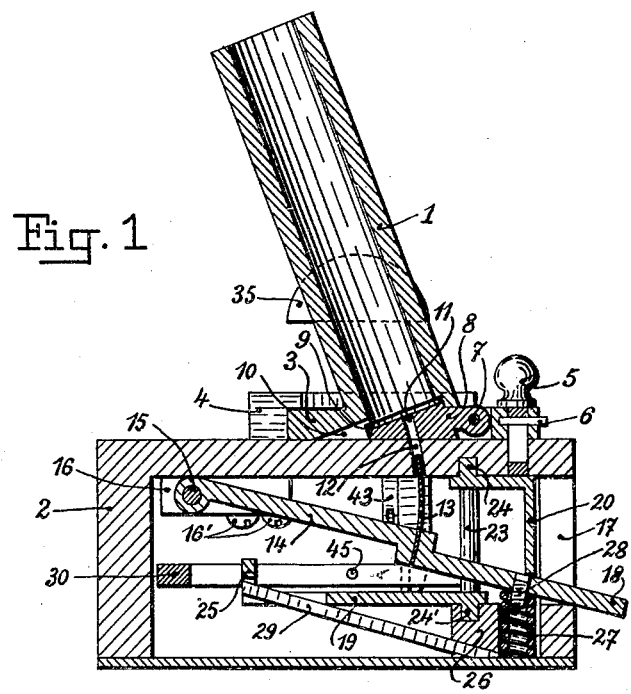
Figure 1 is a section through the burglar alarm according to the line 1—1 of Figure 2.

The alarm apparatus (Figs. 1 and 2) comprises a barrel 1 mounted upon a bed-plate 2 and cast in one piece with a sector-like seat 3, which encloses an appropriate angle (70° in the shown example) with the barrel.

The seat engages two slideways 4 V-like and mounted upon the upper part of the bed-plate 2 and is thereby fixed to the latter, a stud 5 maintained in the seat 3 by a pin 6, engaging a hole provided in the bed-plate and preventing all recoil of the seat 3 in the slideways 4.

In the seat 3 is articulated, on an axis 7, a breach block 8 (Figs. 1 and 3) which closes the breach of the barrel, filling the empty space provided by the inclination of the barrel and serving especially as a buffer to receive the shock and prevent the barrel from moving rearwardly.

In order to charge the barrel it will suffice to lift the stud 5 and to pull the barrel until the seat 3 has left the slideways 4 whereupon the barrel can be reversed; after pivoting the breach block 8 around its axle so as to open the breach of the barrel, the cartridge is inserted into the same. The border 9 of the breach-barrel is engaged by the rim of the cartridge shell. Finally the breach block is placed against the cartridge and the whole is put in its place by the introduction of the seat 3 into its slideways 4.

In order to extract the cartridge it is only necessary to reverse the operation, as will be understood. If the removal of the cartridge is difficult by hand, a tool suitably pointed can be introduced into the shoulder 9 through a groove 10 so as to start the cartridge shell.

Figure 2:
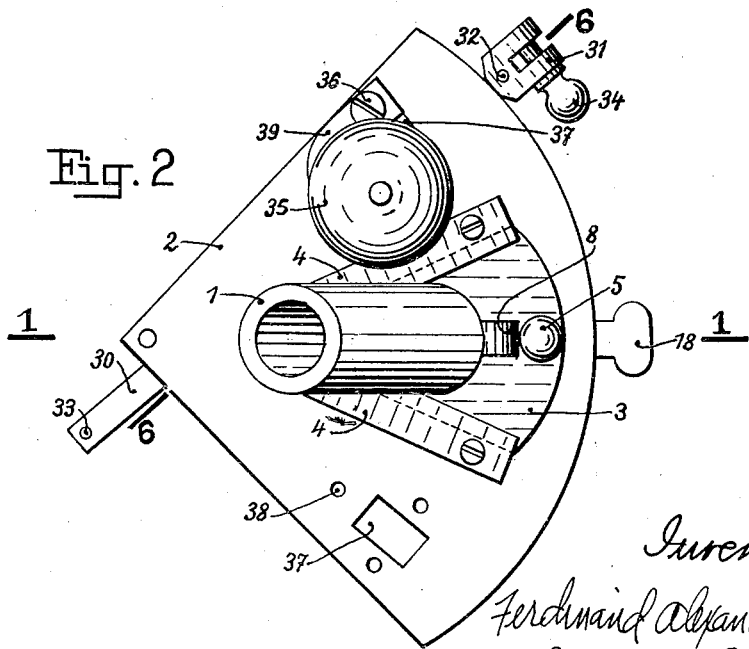
Figure 2 is a plan of the same.

The breech block 8 is provided with an opening 11 in its center, corresponding to an aperture 12 in the bed-plate 2 so as to permit the passage of the firing pin 13 (Figs. 1 and 5).

The pin 13 is carried by a hammer 14 oscillating upon an axle 15 held by two pieces 16 fixed by screws 16′ to the upper wall of the bed-plate.

The hammer 14 passes outwardly of the bed-plate through an opening 17 in the same and in a thumb piece 18 pressed downwardly in order to cock the apparatus.

The cocking of the hammer 14 is effected by a detent tumbler (Fig. 4) comprising an arm 19 and a heel 20 mounted, the one upon a plate 21 and the other upon a plate 22. The two plates 21, 22 are interconnected by two cross-pieces 23 and carry pivots 24, 24' situated in the same vertical axis. The arm 19 is provided with a head 25 slit in its central part so as to permit the passage of a return spring 29 for the tumbler.

The tumbler having the arm 19 and the heel 20 is mounted in the bed-plate 2 (Figs. 1 and 5) so as to guide the hammer 14, the pivot 24 engaging the upper wall of the bed-plate and the pivot 24' entering a block 26 fixed in the bed-plate by two screws 26'. The block 26 is provided with a housing containing the spring 27 for operating the hammer 14. The latter is provided with a stud 28 screwed into it and preventing the spring 27 from escaping laterally.

A straight spring-blade 29 engaging solidly the block 26 passes with its free extremity into the slot in the head 25 of the tumbler and serves to bring back constantly the arm 19 into the axis of the hammer 14 placed just above, and to maintain the detent 20 above the hammer 14, the spring 27 having been previously tensioned by pressure upon the thumb piece 18.

It will be understood that lateral movement of the staple-tumbler is followed by a lateral displacement of the detent 20 and effects release of the hammer, which is then moved to firing position by the spring 27.

The tumbler is actuated by a rod 30 (Fig. 6) traversing the bed-plate 2 and driven more or less into the bed-plate in the interior of which it abuts against the head 25 of the tumbler (Fig. 5).

By placing the bed-plate near a door, with the rod 30 extending laterally outwardly, the door P when opened will encounter this rod and move it and thereby cause the disengagement of the tumbler.

The apparatus can be disengaged by pulling the rod 30 out of engagement with the door.

The rod 30 can be used at either side of the bed-plate. It suffices to change the position of the head 31 upon the rod, the head being held upon the latter by a screw 32. After the fixation of the head upon the other extremity of the rod the said screw is screwed into the hole 33.

The head 31 forms a socket to receive a rod for starting or stopping of the apparatus.

34 is a spindle traversing the head 31 and permitting the connection with the said controlling rod.

The bed-plate 2 (Figs. 1 and 2) carries also a gong 35 fixed by three screws 36 upon the bed-plate at one or the other side of the same and near one of the openings 37 provided in the upper wall of the bed-plate. Threaded holes 38 are provided in advance for the screws 36.

The gong 35 (Figs. 6 and 7) is carried by a plate 39 provided with a socket 40 to penetrate into one of the openings 37 and to carry the hammer 41. The latter is articulated in the socket 40 by an axle 42 and terminates at its base with a projection 43. 44 is a spring blade abutting against the plate 39 and attached to the hammer.

The projection 43 is acted upon by a pin 45 traversing the rod 30 when moved rearwardly, viz. at the moment of disconnection of the apparatus. At this moment the pin 45 acts upon the projection 43 and the spring 44 is tensioned. As soon as the pin 45 continuing its stroke releases the projection 43, the hammer 41 is thrown violently against the gong 35 by the spring. Since there is a free space between the spring 44 and the plate 39, the hammer is thrown backwardly by the gong against the plate 39 and the result will be a to-and fro-motion of the hammer followed by a small chime indicating that the door can be opened without danger.

In order to fix the apparatus and to place the barrel in a suitable direction, an angle iron 46 utilisable in both directions can be fixed, at one part, to the wall and, at the other part, to the bed-plate by means of screws (Fig. 5).

A U-like iron forming the staple is attached by screws to the door and receives the rod 30 if it occupies the working position. After closing the door it is not possible to move this rod rearwardly. Only by breaking the door can the rod be shifted and the apparatus thereby set to work.

To conceal the gun the same may be covered by an ornamented sheet metal hood 51 (Fig. 12) fixed to the bed-plate. The upper part of the hood is preferably provided with a thin plate of mica, celluloid or the like, easily perforated by the projectiles.

In order to render the apparatus practical and ensure its automatic operation the latter is actuated by a control device combined with the lock of the door.

This device comprises a plate 48 (Figs. 8-10) to which is screwed a casing 49 traversed by a pusher comprising a round rod 50 and a socket 52 at one extremity of this rod.

At the other extremity the rod 50 is so shaped that it can be articulated to a bolt 53 of special form (Fig. 11) comprising a slope and a projection 54. The other extremity of the bolt is articulated by an axle 55 to the rod 50.

56 is a spiral spring abutting against the bottom of the casing 49 and against the bolt 53 and tending to push the latter outwardly.

The keeper 57 of the lock is devised in such manner that the bolt 53 is permitted to enter it at the side opposite to the dormant bolt 58 of the lock S in case of no engagement of the latter.

For this purpose the plate 48 is so placed with regard to the keeper that the bolt 53 is situated in the prolongation of the dormant bolt 58 of the lock and at a suitable distance so as not to impede the opening of the door when extending beyond the other side of the keeper.

The controlling device is connected to the fire arm by an appropriate leverage (Fig. 12) or rods, for example by two tubes 59, 60 threaded at their extremities. Into the tube or upon the same is screwed a screw-ring 61 engaging the socket 52 and kept therein by a screwed axle 62. The same tube is screwed by its other extremity upon a threaded part 63, 63' of a rotary piece 64 (Figs. 13, 14) mounted by a pivot 65 upon a plate 66 screwed laterally to the door, as indicated in Fig. 12.

The working of the apparatus is easily to be understood.

When the lock is in its opened position, the bolt 53 pushed by the spring 56 engages the keeper 57 (Fig. 9) and the rods 59, 60 push the rod 30 into the bed-plate, so that the door can be opened at will.

But when shutting the door by its key and when the dormant bolt 58 of the lock engages the keeper 57, the bolt 53 of the controlling device (Fig. 10) is pushed backwardly and the rods 59, 60 actuate the rod 30 so as to draw it outwardly of the bed-plate 2 so as to enter the tumbler 47. The fire arm which has been previously loaded and cocked is now ready for operation. When forcing the lock, the bolt 58 will tear with it the keeper 57, but at the same time it will move the bolt 53 rearwardly owing to the projection 54 applied against the bolt 58.

The bolt 53 pivots around its axle 55 and engages an opening 67 provided in the casing 49. Now, since this opening is slightly narrower than the bolt 53, the latter is arrested and prevents the pusher 50 from moving forwardly owing to the push of the spring 56. Hence the rods 59, 60 prevent the movement of the rod 30 and the firing of the fire arm.

But as soon as the door is pushed a little further, the rod 30 is thrown rearwardly and the fire arm is discharged.

If there was no effort to break the door, the opening of the lock moves, on the contrary, the rod 30 into the bed-plate 2 and the gong 35 sounds and indicates that the door can be reopened without danger.

To enhance the security of the door, a bolt movable from the interior is fitted upon the plate 48, this bolt permitting working of the fire arm even if the lock was opened by means of a false-key or of a stolen key. This bolt comprises a bar composed of two pieces 68, 69 (Figs. 8, 15), the piece 68 being bent at its extremity to prevent shifting back of the bar in case the door is partly opened and to thereby prevent the discharge of the fire arm. The piece 69 is provided with a recess for a latch 70 said latch being terminated at opposite sides by round rods 71, 71'. The piece 68 is articulated to the piece 69 by means of an axle 72 traversing both pieces 73 is a button screwed to the latch and serving for the handling of the same. The threaded bolt of this button passes into a slit 74 provided in the hollowed piece 69. The latch is provided on its other side with a stud or the like 75 penetrating into a slit 76 provided in the plate 48.

This slit has a special form so as to guide the movements of the latch and to block it in two different positions 76a and 76b.

The bar is held upon the plate 48 by means of irons 77 screwed at one part to the wall and at the other part to the said plate.

By closing the door and also the lock from the interior, the pusher is driven back by the dormant bolt of the lock and the fire arm is, owing to this fact, ready to be acted upon by the rods 59, 60. It is now possible to shift the bar 68, 69 and to push it, since the latch 70 has left its position 76a, until the latter descends vertically and its lower round rod 71' engages a hole 78 provided in the socket 31 of the pusher.

The latch 70 hence in this position immobilized the pusher so that even in case of the lock having been opened by means of a stolen key the bolt 53 is not permitted to follow the dormant bolt 58 and the fire arm remains in its "ready" position.

But the bar prevents the door from being opened. In case of a violent push upon the door causing tearing away of the screws 79 of the first iron 77, the piece 68 of the bar would pivot upon the piece 69 but the position of the pusher would not be modified and the opening of the door would be followed by discharge of the fire arm.

In order to protect the habitation against burglary by breaking up one of the panels of the door, it is possible to replace the lug 47 by the following arrangement (Figs. 16 to 18):

In an appropriate casing 80 is provided a piece 81 oscillating easily upon a transverse axle 82 and acted upon constantly by a spring 83 so as to occupy an inclined position, the spring abutting at one part against a beak 84 of the piece 81 and, at the other part, against a cross-piece 85 placed below the piece 81.

The upper part of the casing 80 is provided with an opening 86 making visible the upper part of the piece 81, shaped obliquely and carrying an index 87 arranged to mark the vertical position of the piece 81 with regard to another index 88 traced on the casing 80.

The cross-piece 85 surpasses the said casing and is terminated by a socket 88, receiving an arm 90 upon an axle 89, this arm being terminated in its lower part by an opening 91 arranged to receive the rod 30 of the mortar. This arm 90 can hence oscillate around its axle 89 and drive back this rod, for which purpose this arm is acted upon by a spring 92 abutting against the rear wall of the casing 80 and tending to move the arm 90 and hence the rod 30 when engaging the opening 91 of the arm.

The arm 90 is provided with a tooth 93 engaging a pawl 94 pivoting around an axle 95 supported in two lateral walls of the carter 80.

The pawl 94 is provided with an extension 96 forming a boss, upon which slides a cam or the like 97 provided at the lower part of a piece 98, which slides in two cross-pieces 99, 100 fixed to the casing 80. The piece 98 is provided with a palet 101 passing beyond the casing through a window 102 in the latter.

103 is a spindle fixed to the piece 98 and sliding in the cross-piece 99 and in the cross-beam 85.

The spindle 103 is provided with a shoulder 104 serving for abutment of a spring 105 supported by the cross-piece 99 and pushing constantly the spindle upwardly.

The spindle 103 is placed in the vertical axis passing through the axle of the piece 31, in such manner that its extremity 106 abuts against the said piece. A pin 98' in the piece 98 limits the stroke of the latter and of the spindle, owing to its striking against the cross-piece 100.

The operation of this embodiment may be readily understood.

By applying against the palet 101 the spindle 103 is lowered and its spring is tensioned.

The extremity 106 of the spindle is placed below the piece 81 and is maintained by the latter in this position, so that its spring remains tensioned. At the same time the arm 90 is acted upon so that its tooth 93 engages the pawl 94. Now the apparatus is armed and the rod 30 is pushed into the opening 91.

By pivoting the piece 81 in any way (Fig. 19), the spindle 103 is permitted to raise owing to the action of its spring 105. The ascending spindle carries with it the piece 98, the passage of the cam or notch 97 over the boss 96 causing disengagement of the pawl 94 from the tooth 93 of the arm 90, so that the spring 92 moves the arm and together with it the rod 30, whereby the fire arm is acted upon. In order to actuate the piece 81, a hole 107 is provided in the same, receiving the extremity of a thread or wire of metal or of any appropriate textile substance 108 disposed in tubes or the like forming a net-work behind the door to be protected.

The other extremity of the thread or wire 108 is attached to an axle 109 of a small windlass with a ratchet wheel 110 and a pawl 111 (Fig. 20), permitting the regulation of the tension of the thread or wire 108 owing to a key 112 screwed upon the axle 109 of the windlass.

The regulation is effected by bringing the index 87 of the piece 81 into a position opposite the index 83 of the casing 80, by overcoming the resistance of the spring 83 which resists to the pull of the wire or thread 108 until the position of the piece 81 is exactly vertical. It will be understood that each sectioning of the thread or wire 108 frees the spring 89 which oscillates the piece 81 whereby the apparatus is acted upon (Fig. 1).

If, on the contrary, the wire or thread 108 is pulled as the result of the breaking in of a panel, the piece 81 is oscillated in the opposite direction, so that in this case, also the fire arm is discharged.

The operation of the burglar alarm is hence secured in both cases.

Such a protecting arrangement can of course be used for other purposes such as for the protection of furniture, of walls and the like.

What I claim, is:

1. Burglar alarm apparatus comprising a fire alarm including a spring operated hammer, a detent to hold the hammer, a trigger bar to release the detent from the hammer and door actuated operating means for the trigger bar, whereby upon opening of the door the fire arm is discharged.

2. Apparatus as claimed in claim 1, including also an alarm apparatus having controlling means actuated by the trigger bar on initial movement of the trigger bar less than sufficient to release the detent element.

3. Apparatus as claimed in claim 1, including a spring active to normally hold the detent element in engaging position with respect to the hammer.

4. Apparatus as claimed in claim 1, in which the hammer element and detent element are pivotally mounted and the pivotal axis of the detent element is substantially at right angles to that of the hammer element.

5. Apparatus as claimed in claim 1, in which the hammer element and detent element are pivotally mounted and the pivotal axis of the detent element is substantially at right angles to that of the hammer element and a trigger bar is movable transversely in a plane substantially parallel to the plane of movement of the detent element.

6. Apparatus as claimed in claim 1, in which the hammer element and detent element are pivotally mounted and the pivotal axis of the detent element is substantially at right angles to that of the hammer element and a trigger bar is movable from either end transversely in a plane substantially parallel to the plane of movement of the detent element.

7. Apparatus as claimed in claim 1, including a base in which the hammer element, detent element and trigger bar are mounted and on which the fire arm is also mounted and for detachment and in which the fire arm has a breech block which is pivotally and detachably mounted on the base.

8. Apparatus as claimed in claim 1, including means arranged for application to a door panel and for actuating the trigger actuating means in the event of a breaking of the panel.

9. Apparatus as claimed in claim 1, in which the trigger bar operating means includes a releasing element and a cord attached to said releasing element and arranged to be pulled or broken by the opening of the door.

10. Apparatus as claimed in claim 1, in which the trigger bar operating means includes a releasing element and a cord attached to said releasing element and arranged to be pulled or broken by the opening of the door and means to tension said cord.

In witness whereof I affix my signature.

FERDINAND ALEXANDRE DUQUESNE.